US008858654B2

(12) United States Patent
Fujii et al.

(10) Patent No.: US 8,858,654 B2
(45) Date of Patent: Oct. 14, 2014

(54) ACTIVATED CARBON FOR ELECTRIC DOUBLE LAYER CAPACITOR ELECTRODE AND METHOD FOR PRODUCING THE ACTIVATED CARBON

(75) Inventors: Masaki Fujii, Tokyo (JP); Keizo Ikai, Tokyo (JP); Noriyuki Kiuchi, Tokyo (JP); Kunihiko Satou, Tokyo (JP); Shinya Taguchi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/638,017

(22) PCT Filed: Mar. 11, 2011

(86) PCT No.: PCT/JP2011/055801
§ 371 (c)(1),
(2), (4) Date: Sep. 28, 2012

(87) PCT Pub. No.: WO2011/122309
PCT Pub. Date: Oct. 6, 2011

(65) Prior Publication Data
US 2013/0027845 A1  Jan. 31, 2013

(30) Foreign Application Priority Data
Mar. 30, 2010 (JP) ................................. 2010-079083

(51) Int. Cl.
*H01G 9/00* (2006.01)
*H01G 11/34* (2013.01)
*C01B 31/12* (2006.01)
*H01G 11/24* (2013.01)
*H01G 11/44* (2013.01)

(52) U.S. Cl.
CPC ................ *C01B 31/12* (2013.01); *H01G 11/24* (2013.01); *H01G 11/34* (2013.01); *Y02E 60/13* (2013.01); *H01G 11/44* (2013.01)
USPC .......................................... 29/25.03; 361/502

(58) Field of Classification Search
None
See application file for complete search history.

(56) References Cited

U.S. PATENT DOCUMENTS 7,993,619 B2 * 8/2011 Tano et al. ................. 423/445 R
8,273,683 B2 * 9/2012 Tanaka ......................... 502/416

(Continued)

FOREIGN PATENT DOCUMENTS

EP  1498389 A1  1/2005
EP  2325139 A1  5/2011

(Continued)

OTHER PUBLICATIONS

Int'l Search Report issued Jun. 14, 2011 in Int'l Application No. PCT/JP2011/055801.

(Continued)

*Primary Examiner* — Eric Thomas
*Assistant Examiner* — Dion R Ferguson
(74) *Attorney, Agent, or Firm* — Panitch Schwarze Belisario & Nadel LLP

(57) ABSTRACT

Provided is a method for producing an activated carbon for an electric double layer capacitor electrode comprising adjusting a carbon material (including a calcined product of a carbon material) in particle size, followed by mixing the carbon material with an alkali activator, and then activating the mixture, wherein the mixing is carried out so that the particle size distribution composed of particles with a size of 300 μm or greater in the mixture of the carbon material and alkali activator is 5 percent or less so that the mixing state of the carbon material and alkali activator can be improved, resulting in a reduction in the ratio of the alkali activator.

8 Claims, 1 Drawing Sheet

(56) References Cited

U.S. PATENT DOCUMENTS

| | | |
|---|---|---|
| 2002/0126439 A1 | 9/2002 | Sato et al. |
| 2008/0304206 A1* | 12/2008 | Tano et al. .................. 361/502 |
| 2010/0214722 A1 | 8/2010 | Fujii et al. |

FOREIGN PATENT DOCUMENTS

| | | |
|---|---|---|
| JP | 2002-104817 A | 4/2002 |
| JP | 2002-134369 A | 5/2002 |
| JP | 2006-059923 A | 3/2006 |
| JP | 2008-013412 A | 1/2008 |
| JP | 2008-222551 A | 9/2008 |
| JP | 2009-234901 A | 10/2009 |
| WO | 2010032407 A1 | 3/2010 |

OTHER PUBLICATIONS

Extended European Search Report issued Jan. 9, 2014 in EP Application No. 11762549.1.

* cited by examiner

ACTIVATED CARBON FOR ELECTRIC DOUBLE LAYER CAPACITOR ELECTRODE AND METHOD FOR PRODUCING THE ACTIVATED CARBON

CROSS-REFERENCE TO RELATED APPLICATION

This application is a Section 371 of International Application No. PCT/JP2011/055801, filed Mar. 11, 2011, which was published in the Japanese language on Oct. 6, 2011, under International Publication No. WO 2011/122309 A1, and the disclosure of which is incorporated herein by reference.

TECHNICAL FIELD

The present invention relates to an activated carbon for an electric double layer capacitor electrode and a method for producing such an activated carbon.

BACKGROUND ART

An activated carbon is made from carbon materials such as carbonized coconut shell, petroleum coke or coal coke that is activated to have a porous structure. The activated carbon, which is porous and thus has a large surface area, has been widely used as an absorbent, a catalyst support, and an electrode material for double layer capacitors and lithium secondary batteries. In particular, in order to increase the energy density, i.e., capacitance in an electric double layer capacitor, which may be used in a hybrid car or the like, an activated carbon having fine pores effectively formed thereon, a high crystallinity and a large surface area has been demanded to be used as an electrode material for the capacitor.

For the industrial production of such an activated carbon with effectively formed fine pores that can be used as an electrode material of an electric double layer capacitor, a method for activation has been generally used, in which a carbon material such as petroleum coke and an alkali metal compound such as potassium hydroxide are heated at a temperature of 600 to 1200° C. in an inert gas atmosphere to allow the alkali metal to ingress between and react with the resulting graphite crystal layers (Patent Literature 1). In this type of activation, the alkali metal enters the layered structure wherein condensed polycyclic hydrocarbons are layered, and as the result forms fine pores.

In a method for producing an activated carbon for an electric double layer capacitor electrode by activating carbon material with an alkali activator, the activator is generally used in an amount of 2 to 4 parts by weight of the carbon material to be mixed therewith. In particular, when the intended specific surface area is large ranging from 2000 to 3000 m$^2$/g, the activated carbon is produced necessarily at a large "activator/carbon material" ratio. However, it is desired to minimize the ratio of the alkali activator to be used because the share thereof in the production cost is large.

In mixing of a carbon material and an alkali activator, the carbon material is water-repellant and thus poor in wettability with the alkali activator, which is water-soluble. Simple mixing of these two materials makes the contact therebetween insufficient. A large part of the activator is thus not used for activation reaction, and the resulting activated product (activated carbon) is small in specific surface area.

As a means for bringing these materials into strong contact, methods have been known, wherein the materials are mechanically mixed with a ball mill or a Henschel mixer and wherein the alkali activator is melted and then mixed with the carbon material (Patent Literature 2). However, any of these methods requires the use of an activator in an amount greater than the theoretical amount so as to proceed with the activation reaction efficiently and causes an increase in the production cost.

CITATION LIST

Patent Literatures

Patent Literature 1: Japanese Patent Laid-Open Publication No. 2006-059923
Patent Literature 2: Japanese Patent Laid-Open Publication No. 2002-134369

SUMMARY OF INVENTION

Technical Problem

As the results of extensive studies and research, the present invention was accomplished on the basis of the finding of a method that can proceed with a reaction of a carbon material and an alkali activator in an extremely efficient manner and as the result, enables the amount of the alkali activator to be less than ever before.

Solution To Problems

That is, the present inventions are as follows:
[1] a method for producing an activated carbon for an electric double layer capacitor electrode comprising adjusting a carbon material (including a calcined product of a carbon material) in particle size, followed by mixing the carbon material with an alkali activator, and then activating the mixture, wherein the mixing is carried out so that the particle size distribution composed of particles with a size of 300 μm or greater in the mixture of the carbon material and alkali activator is 5 percent or less;
[2] the method according to [1] above wherein the carbon material is graphitizable;
[3] the method according to [1] or [2] above wherein the calcination temperature for producing the calcined product of a carbon material is 500° C. or higher and 700° C. or lower;
[4] the method according to any of [1] to [3] above wherein the carbon material having been adjusted in particle size has an average particle diameter of 1 μm or larger and 15 μm or smaller;
[5] the method according to any of [1] to [4] above wherein the mix ratio of the carbon material alkali activator is from 1:1 to 1:4 by mass ratio;
[6] an activated carbon for an electric double layer capacitor electrode produced by any of the methods according to [1] to [5] above; and [7] an electric double layer capacitor comprising the electrode according to [6] above.

Advantageous Effects of Invention

The present invention can proceed with a reaction of a carbon material and an alkali activator in an extremely efficient manner and as the result, enables the amount of the alkali activator to be less than ever before, resulting in a significant production cost reduction. Furthermore, the present invention can provide an activated carbon that is excellent in uniformity, and the use of the activated carbon for an electrode of an electric double layer capacitor can provide a capacitor having a large capacitance per unit volume.

DESCRIPTION OF EMBODIMENTS

Figure 1:
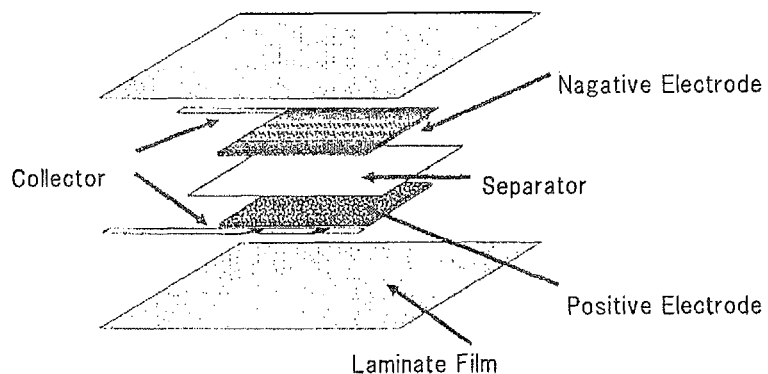
FIG. 1 a view showing the structure of a laminated cell used for evaluating a carbon electrode.

The present invention will be described in detail below.

In the present invention, a carbon material and/or a calcined product thereof is used as a starting material.

The carbon material is preferably a graphitizable carbon material. Examples of the graphitizable carbon material include petroleum coke and coal coke. The graphitizable carbon material may also be mesophase pitch and infusibilized and carbonized mesophase pitch fiber produced by spinning mesophase pitch. Petroleum coke is preferably used.

The petroleum coke is a product containing mainly solid carbon produced by thermal cracking (coking) a heavy fraction of petroleum at a high temperature on the order of 500° C. and is referred to as petroleum coke to be differentiated from ordinary coal-based coke. There are petroleum coke produced by delayed coking and petroleum coke produced by fluid coking. Currently, the former constitutes the majority. In the present invention, petroleum green coke (green coke) remaining as it is taken out from a coker is preferably used. The green coke produced by delayed coking contains 6 to 13 percent by mass of a volatile component while the green coke produced by fluid coking contains 4 to 7 percent by mass of a volatile component. In the present invention, the green coke produced by either one of the methods may be used. However, the green coke produced by delayed coking is particularly suitable in view of easy availability and stable quality.

No particular limitation is imposed on the heavy fraction of petroleum. Examples of the heavy fraction include heavy oil that is a residue produced when petroleums are vacuum-distilled, heavy oil produced by fluid catalytic cracking petroleums, heavy oil produced by hydrodesulfurizing petroleums, and mixtures thereof.

In the present invention, (1) the above-described carbon material is adjusted in particle size and then mixed with an alkali activator for an activation reaction, or (2) the carbon material is calcined, followed by adjustment in particle size and then mixed with an alkali activator for an activation reaction.

In the case of calcining a carbon material, it is calcined at a temperature of preferably 500 to 700° C., more preferably 500 to 650° C. in an inert gas. No particular limitation is imposed on the temperature rise rate during calcination. However, a too slow rate would take time for the treatment while a too rapid temperature rise would cause volatile components to volatile explosively, possibly resulting in breakage of crystalline structures The calcination is thus carried out at a rate 30 to 600° C./hour, preferably 60 to 300° C./hour.

Once an intended calcination temperature reaches, the temperature is preferably kept for a certain period of time. The period is usually on the order of 10 minutes to 2 hours.

In the present invention, the carbon material (including calcined products) is necessarily adjusted in particle size before being mixed with an alkali metal compound.

Adjustment in particle size is carried out so that the average particle diameter of the carbon material is from 1 to 15 μm, preferably from 1 to 10 μm, more preferably from 1 to 8 μm. A particle diameter of smaller than 1 μm is not preferable because it would incur an increase in particle diameter caused by fusion among the particles. A particle diameter of larger than 15 μm is not also preferable because it would be larger than the intended particle size.

No particular limitation is imposed on the method for adjusting the particle diameter of the carbon material. A method is generally used, wherein the carbon material is pulverized with a pulverizing means such as a jet mill.

Next, the carbon material having been adjusted in particle size is treated in a mixing step where it is mixed with an alkali activator and an activation step where an activation reaction is carried out.

In the present invention, the mixing state of the carbon material and alkali activator can be improved with a method for making the distribution value composed of particles with a size of 300 μm or greater in the particle size distribution 5 percent or less thereby reducing the ratio of the alkali activator to the carbon material.

In order to obtain the optimum particle size distribution of the mixture of the carbon material and alkali activator, a method which has been used for a conventional mixing operation may be used, where the resulting mixture having been pulverized with a ball mill or a Henschel mixer is classified with a sieve to remove the particles with a diameter of 300 μm or greater. No particular limitation is imposed on the conditions for pulverization, which is, however, carried out at room temperature for 10 minutes to 2 hours. If necessary, the classified product with a particle size of 300 μm or greater that generate during pulverization may be put in used for mixing again so as to produce the intended mixture.

A method is also preferably used, wherein a pulverizing mixer having both a pulverizing-mixing function and a classifying function is used. This mixer is a normal pulverizing mixer which is further equipped with a classifying device classifying mixtures and returning particles with a size larger than the predetermined particle size to the pulverizing mixer and enables the mixture to be adjusted in particle size by controlling the revolution numbers of the crushing rotors used for pulverizing and mixing and the classifying rotors used for classification. Pulverization with the pulverizing mixer having both a pulverizing-mixing function and a classifying function is more efficient than the conventional pulverizing and mixing with a ball mill or a Henschel mixer and usually carried out at room temperature for 10 seconds to 5 minutes.

The inventors of the present invention has found that whether the mixing state of the carbon material and the alkali activator is good or bad has a correlation with the ratio of the particles with a 300 μm or greater diameter in the particle size distribution. That is, they have found that an excellent mixing state is obtained when the distribution value of particles with a particle size of 300 μm or greater in the particle size distribution is 5 percent or less.

As described above, when manufacturing an activated carbon with a specific surface area that is the same as the conventional ones, making a uniform and excellent mixing sate enables activation to be carried out with a less activator and also an activated carbon with an excellent activation uniformity to be produced.

The present invention is characterized in that the intended activated carbon can be produced by mixing the carbon material and alkali activator so that the mixture has a 300 μm or greater particle size distribution of 5 percent or less even though the amount of the alkali metal is reduced than the usual. That is, the mix ratio of the carbon material and alkali activator is preferably from 1:1 to 1:4, more preferably from 1:1 to 1:3, more preferably from 1:1.2 to 1:2.5 in terms of the mass ratio of the both (carbon material:activator).

Examples of the activator to be used for activation reaction include KOH, NaOH, RbOH, and CsOH. Amongst, KOH is preferably in view of activation effect.

No particular limitation is imposed on the conditions for activation if the reaction can be progressed sufficiently. The reaction may be carried out under the similar conditions to those for the conventional activation treatment to be carried out for the production of a conventional activated carbon. For example, activation may be carried out by mixing an alkali activator and a carbon material and then heating the mixture under elevated temperature conditions of preferably 400° C. or higher, more preferably 600° C. or higher, more preferably 700° C. or higher. No particular limitation is imposed on the upper limit temperature if the activation reaction proceeds without any problem, which is, however, preferably 900° C. or lower.

The activated product thus produced is then subjected to washing treatment. A method for washing the activated product is preferably a method wherein the activated product is washed with a washing liquid and solid-liquid separation is carried out. For example, a method may be employed, wherein the activated product is immersed in a washing liquid and if necessary stirred and heated so as to be mixed therewith, and the washing liquid is removed.

The washing liquid is preferably water or an acid aqueous solution. For example, any combination such as washing with water, washing with an acid aqueous solution, and washing with water may be used.

Examples of the acid aqueous solution include halogenated hydracids such as hydrochloric acid, hydriodic acid, and hydrobromic acid, and inorganic acids such as sulfuric acid and carbonic acid. The concentration of the acid aqueous solution may be from 0.01 to 3 N. Washing with these washing liquids may be repeated more than once if necessary.

No particular limitation is imposed on the amount of the alkali metal remaining in the activated product after washing if the amount is lower than such a level (preferably 1000 ppm by mass or less) that possibly adversely affects the resulting electric double layer capacitor. However, for example, the activated product is preferably washed so that the pH of the detergent drain is from 7 to 8 and washed so that the alkali metal is removed as much as possible. After washing, the activated product undergoes a drying step that is conventionally carried out, thereby producing the intended activated carbon.

The activated carbon produced by the present invention has usually an average particle diameter of 1 to 12 μm and a specific surface area of 1500 to 3000 M$^2$/g. Further, the pore volume of the pores with a diameter of 0.1 to 50 nm in the activated carbon, determined by a nitrogen gas adsorption method is from 0.5 to 3 ml/g while the pore volume of the pores with a diameter of 0.05 to 300 μm in the activated carbon, determined by mercury intrusion technique is from 0.4 to 5 ml/g. The remaining alkali metal content is 200 ppm by mass or less.

The use of the activated carbon of the present invention having the above-described characteristics for an electric double layer capacitor electrode can provide an electric double layer capacitor having a large capacitance per unit volume.

Next, the electric double layer capacitance of the present invention will be described.

The electric double layer capacitance of the present invention is characterized in that it is provided with electrodes containing an activated carbon prepared as described above.

The electrodes are configured with the activated carbon and a binder and preferably in addition an electric conductive agent and may be electrodes that are integrated with a collector.

The binder used herein may be any conventional one. Examples of the binder include polyolefins such as polyethylene and polypropylene, fluorinated polymers such as polytetrafluoroethylene, polyvinylidene fluoride and fluoroolefin/vinylether cross-linked copolymers, celluloses such as carboxylmethyl cellulose, vinyl polymers such as polyvinylpyrrolidone and polyvinyl alcohol, and polyacrylic acids. No particular limitation is imposed on the content of the binder in the electrode. The content is usually selected within the range of 0.1 to 30 percent by mass on the basis of the total amount of the activated carbon and the binder.

The electric conductive agent may be a powdery material such as carbon black, powder graphite, titanium oxide and ruthenium oxide. The blend amount of the electric conductive material in the electrode is suitably selected depending on the purposes of blending. The blend amount is usually selected within the range of usually 1 to 50 percent by mass, preferably from 2 to 30 percent by mass on the basis of the total amount of the activated carbon, binder and electric conductive agent.

The activated carbon, binder and electric conductive agent may be mixed by a conventional method. For example, a method may be employed, wherein a solvent that dissolves the binder is added to these components to prepare slurry, which is then applied evenly on a collector or wherein these components are kneaded without adding such a solvent and pressed at ordinary temperature or while being heated.

The collector may be any of those of conventional materials with conventional shapes. Examples of the material include metals such as aluminum, titanium, tantalum, and nickel and alloys such as stainless.

The unit cell of the electric double layer capacitor of the present invention is formed by placing a pair of the above-described electrodes used as an anode and a cathode to face each other via a separator (polypropylene fiber nonwoven fabric, glass fiber fabric or synthetic cellulose paper) and then immersing the electrodes into an electrolytic solution.

The electrolytic solution may be any of aqueous or organic electrolytic solutions known in the art. However, organic electrolytic solutions are preferably used. Examples of such organic electrolytic solutions include those used for electrochemical electrolytic solutions such as propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethylsulfoxide, tetrahydrofuran, dimethoxyethane, methyl formate, dimethyl carbonate, diethyl carbonate, and ethyl methyl carbonate. These electrolytic solutions may be used in combination.

No particular limitation is imposed on the supporting electrolyte in the organic electrolytic solution. Therefore, the supporting electrolyte may be any of various salts, acids, and alkalis that are generally used in the electrochemical field or the battery field. Examples of such a supporting electrolyte include inorganic ionic salts such as alkali metal salts and alkaline earth metal salts, quaternary ammonium salts, cyclic quaternary ammonium salts, and quaternary phosphonium salts. Preferable examples include $(C_2H_5)_4NBF_4$, $(C_2H_5)_3(CH_3)NBF_4$, $(C_2H_5)_4PBF_4$, $(C_2H_5)_3(CH_3)PBF_4$. The concentrations of such salts in electrolytic solutions are properly selected from the range of usually 0.1 to 5 mol/l, preferably 0.5 to 3 mol/l.

No particular limitation is imposed on the more specific configuration of the electric double layer capacitor. However, example of the configuration include a coin type accommodating a pair of electrodes (positive and negative electrodes) in the form of sheet or disc with a thickness of 10 to 500 μm and a separator sandwiched between the electrodes, in a metal case, a wound type comprising a pair or electrodes and a separator disposed therebetween, all of which are wound, and a layered type comprising electrodes stacked via separators.

EXAMPLES

The present invention will be described in more details with reference to the following examples but is not limited thereto.

Specific surface area and pore volume were calculated from the adsorption isotherm obtained by nitrogen gas adsorption using an automatic specific surface measuring apparatus (BELSORP-mini II type, manufactured by BELL JAPAN, INC.), by the BET method.

Particle size distribution was measured using a laser diffraction type particle size distribution measuring apparatus (LA-950, manufactured by HORIBA, Ltd.). For carbon powder, the particle size distribution thereof was measured after being mixed with a small amount of a surface acting agent using water as a dispersing medium and then irradiated with an ultrasonic wave. For a KOH/carbon material mixture, the particle size distribution thereof was measured using cyclohexane as a dispersing medium. Particle diameters accounting for 10 percent (D10), 50 percent (D50, average particle diameter) and 90 percent (D90) in the particle size distribution and a distribution value of 300 μm or larger particles were determined from the resulting particle size integral curve on the basis of the volume.

Example 1

Petroleum green coke having an average particle diameter of 2 mm or smaller was crushed with a jet mill to be adjusted in particle size to an average particle diameter of 8 μm. Potassium oxide (KOH) was added in an amount of 140 parts by mass to 100 parts by mass of the pulverized product and then mixed in a pulverizing mixer with a classifying function (ACM mixer manufactured by HOSOKAWA MICRON CORPORATION). The revolution number of the pulverizing rotors was 4500 rpm while the revolution number of the classifying rotors was 2400 rpm. The resulting mixture had a D50 of 16 μm and a 300 μm or greater particle size distribution value of 0 percent. The mixture was activated at a temperature of 750° C. in a nitrogen gas atmosphere for one hour. The mixture was repeatedly washed with water and acid (hydrochloric acid was used) to remove the remaining metal potassium in the carbon material and dried thereby producing an activated product (a carbon material for an electric double layer capacitor electrode). The resulting activated product (a carbon material for an electrode) was 1788 $m^2/g$ in a specific surface area determined by nitrogen gas adsorption method (BET method) and 0.839 $cm^3/g$ in pore volume.

The resulting electrode carbon material was mixed with carbon black and polytetrafluoroethylene powder and then pressed thereby producing a carbon electrode sheet with a thickness of around 150 to 200 μm. Electrodes with a predetermined size were cut out from the sheet to produce a laminate cell shown in FIG. 1. The cell was used to evaluate the carbon electrode material for a capacitor. The electrolyte was a propylene carbonate (PC) solution of 1.5 M of tirethylmethylammonium tetrafluoro borate (TEMA.BF$_4$).

Figure 2:
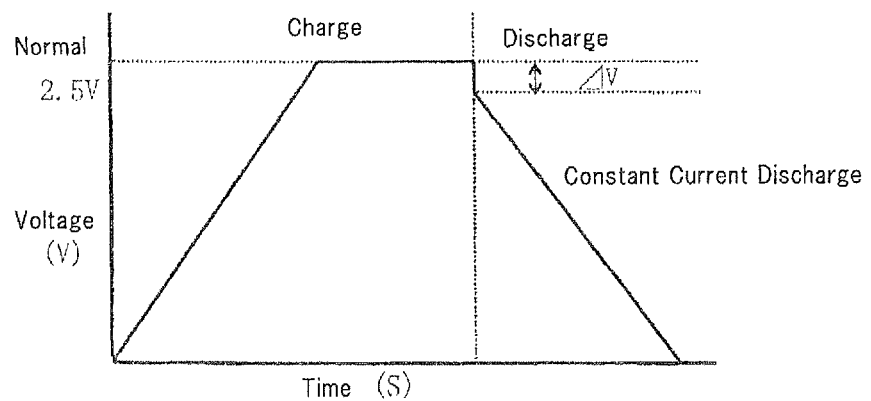
FIG. 2 a view showing a method for measuring initial characteristics (capacitance, internal resistance) of a capacitor.

The laminate cell was used to measure the initial characteristics of the capacitor (capacitance, internal resistance). FIG. 2 shows the method of the measurement.

Capacitance was determined by measuring the total energy amount stored in the capacitor for calculation (energy conversion method).

Capacitance: $C=2 U/Vc^2$ $Vc=Vm-\Delta V$

U: Total discharge energy (integral value of discharge curve from full charge Vm to 0V)

Vc: Actual voltage obtained by subtracting a voltage drop due to internal resistance from full charged voltage Internal resistance was calculated from IR drop immediately after the initiation of discharge.

Internal resistance: $R(\Omega)=\Delta V/I$ wherein I is a discharge current (A).

The rate characteristics of the capacitor were determined by measuring the capacitance after the constant current discharge was changed from 0.36 mA/cm$^2$ to 72 mA/cm$^2$. The results of the rate characteristics were summarized as the maintenance rate of capacitance upon change of the constant current discharge on the basis of the capacitance at a discharge of 0.36 mA/cm$^2$. The results are set forth in Table 2.

Example 2

A mixture was produced under the same conditions for Example 1 except that the ratio of potassium hydroxide to 100 parts by mass of the pulverized product was changed to 220 parts by mass (the mixture had a D50 of 19 μm and a 300 μm or greater particle size distribution value of 0 percent). The resulting mixture was activated to produce an activated carbon for an electrode with the same procedures of Example 1. The resulting activated product (a carbon material for an electrode) was 2324 $m^2/g$ in a specific surface area determined by nitrogen gas adsorption method (BET method) and 1.087 $cm^3/g$ in pore volume.

Example 3

The same petroleum green coke as used in Example 1 was pulverized with a jet mill so as to have an average particle diameter of 13 μm. The pulverized product in an amount of 100 parts by mass was mixed with 220 parts by mass of KOH with a mixer wherein the revolution number of the pulverizing rotors was 4500 rpm and the revolution number of the classifying rotors was 2000 rpm (the mixture had a D50 of 21 μm and a 300 μm or greater particle size distribution value of 0 percent). The resulting mixture was activated, and the resulting activated product (a carbon material for an electrode) was 2091 $m^2/g$ in a specific surface area determined by nitrogen gas adsorption method (BET method) and 1.029 $cm^3/g$ in pore volume.

Example 4

The same petroleum green coke as used in Example 1 was calcined at a temperature of 550° C. for one hour in a nitrogen gas atmosphere. The temperature rise rate during calcination was 200° C./hour. The calcined product was pulverized with a jet mill to have an average particle diameter of 6 μm. The pulverized product was mixed with potassium hydroxide in the same manner as Example 2 except that the revolution number of the pulverizing rotors was 3500 rpm and then activated at a temperature of 700° C. for one hour, washed, and dried thereby producing an activated carbon. The mixture had a D50 of 51 μm and a 300 μm or greater particle size distribution value of 5 percent. The mixture had a specific surface area of 2142 m²/g and a pore volume of 1.027 cm³/g.

Example 5

An activated carbon for an electrode was produced with the same procedures of Example 4 except that potassium hydroxide in an amount of 220 parts by mass is mixed with 100 parts by mass of the pulverized product which was the same as that produced in Example 4 in a ball mill, and the mixture was classified to 300 μm or smaller particles. The resulting mixture had a D50 of 69 μm and a 300 μm or greater particle size distribution value of 0 percent, and the activated carbon was 2273 m²/g in a specific surface area determined by nitrogen gas adsorption method (BET method) and 1.050 cm³/g in pore volume.

Comparative Example 1

The procedures of Example 1 was followed except that the carbon material adjusted in particle size and KOC was mixed without using a pulverizing mixer and pulverized at room temperature for one hour with a usual ball mill. The mixture had a D50 of 625 μm and a 300 μm or greater particle size distribution value of 30.3 percent. The mixture was activated, washed and dried in the same manner as Example 1 but was not sieved. The resulting activated carbon had a specific surface area of 1465 m²/g and a pore volume of 0.655 cm³/g.

Comparative Example 2

A mixture was produced under the same conditions of Example 1 except that the ratio of the pulverized product (average particle diameter of 8 μm) produced by pulverizing the same petroleum green coke as used in Example 1 was changed from 100 parts by mass to 80 parts by mass (the mixture had a D50 of 15 μm and a 300 μm or greater particle size distribution value of 0 percent). The mixture was activated, washed and dried in the same manner as Example 1 thereby producing an activated carbon. The activated carbon had a specific surface area of 1359 m²/g and a pore volume of 0.621 cm³/g.

Comparative Example 3

A mixture was produced with the same procedures of Example 2 except that the revolution number of the pulverizing rotors was changed to 3000 rpm (the mixture had a D50 of 52 μm and a 300 μm or greater particle size distribution value of 36.3 percent). The mixture was activated, washed, and dried in the same manner as Example 2. The resulting activated product (a carbon material for an electrode) was 1632 m²/g in a specific surface area determined by nitrogen gas adsorption method (BET method) and 0.780 cm³/g in pore volume.

Comparative Example 4

A mixture was produced with the same procedures of Example 2 except that the revolution numbers of the pulverizing rotors and classifying rotors were each changed to 3000 rpm (the mixture had a D50 of 53 μm and a 300 μm or greater particle size distribution value of 17.8 percent). An activated carbon for an electrode was produced from this mixture. The resulting activated carbon (a carbon material for an electrode) was 1692 m²/g in a specific surface area determined by nitrogen gas adsorption method (BET method) and 0.981 cm³/g in pore volume.

Comparative Example 5

A mixture was produced with the same procedures of Example 4 except that the revolution numbers of the pulverizing rotors and classifying rotors were changed to 4500 rpm and 1500 rpm, respectively (the mixture had a D50 of 80 μm and a 300 μm or greater particle size distribution value of 25.2 percent). An activated carbon for an electrode was produced from this mixture. The resulting activated carbon (a carbon material for an electrode) was 1727 m²/g in a specific surface area determined by nitrogen gas adsorption method (BET method) and 0.824 cm³/g in pore volume.

Comparative Example 6

A mixture of the same pulverized product as used in Example 5 and KOH with a ball mill had a D50 of 1314 μm and a 300 μm or greater particle size distribution value of 59.1 percent. The mixture was activated, washed and dried in the same manner as Example 5 thereby producing an activated carbon. The activated carbon had a specific surface area of 1651 m²/g and a pore volume of 0.760 cm³/g.

TABLE 1

| | Items | Example 1 | Example 2 | Example 3 | Example 4 | Example 5 | Comparative Example 1 |
|---|---|---|---|---|---|---|---|
| Calcination | Calcination Conditions | Not Carried Out | Not Carried Out | Not Carried Out | 550° C. 1 hr | 550° C. 1 hr | Not Carried Out |
| Particle Size Adjustment | Average Particle Diameter (μm) | 8 | 8 | 13 | 6 | 6 | 8 |
| Mixing | Pulverizing Rotor Revolution Number (rpm) | 4500 | 4500 | 4500 | 3500 | Ball Mill Mixing | Ball Mill Mixing |
| | Classifying Rotor Revolution Number (rpm) | 2400 | 2400 | 2000 | 2400 | 300 μm or smaller | Without Sieving |
| Mix Ratio | Activator/Carbon (g/g) | 1.4 | 2.2 | 2.2 | 2.2 | 2.2 | 1.4 |
| Mixture | Particle Size Distribution (um) D10 | 7 | 8 | 8 | 9 | 11 | 10 |
| | D50 | 16 | 19 | 21 | 51 | 69 | 625 |
| | D90 | 76 | 107 | 109 | 258 | 1063 | 1120 |
| | 300 μm or greater(%) | 0 | 0 | 0 | 5 | 0 | 30.3 |
| Activation | Activation Temperature | 750 | 750 | 750 | 700 | 700 | 750 |
| Activated Product | Specific Surface Area (m²/g) | 1788 | 2324 | 2091 | 2142 | 2273 | 1465 |
| | Pore Volume (cm³/g) | 0.839 | 1.087 | 1.029 | 1.027 | 1.05 | 0.655 |

TABLE 1-continued

| | Items | | Comparative Example 2 | Comparative Example 3 | Comparative Example 4 | Comparative Example 5 | Comparative Example 6 |
|---|---|---|---|---|---|---|---|
| Calcination | Calcination Conditions | | Not Carried Out | Not Carried Out | Not Carried Out | 550° C. 1 hr | 550° C. 1 hr |
| Particle Size Adjustment | Average Particle Diameter (μm) | | 8 | 8 | 13 | 6 | 6 |
| Mixing | Pulverizing Rotor Revolution Number (rpm) | | 4500 | 3000 | 3000 | 4500 | Ball Mill Mixing |
| | Classifying Rotor Revolution Number (rpm) | | 2400 | 2400 | 3000 | 1500 | Without Sieving |
| Mix Ratio | Activator/Carbon (g/g) | | 0.8 | 2.2 | 2.2 | 2.2 | 2.2 |
| Mixture | Particle Size Distribution (um) | D10 | 7 | 8 | 10 | 8 | 12 |
| | | D50 | 15 | 52 | 53 | 80 | 1314 |
| | | D90 | 72 | 1998 | 780 | 843 | 2355 |
| | | 300 μm or greater(%) | 0 | 36.3 | 17.8 | 25.2 | 59.1 |
| Activation | Activation Temperature | | 750 | 750 | 750 | 700 | 700 |
| Activated Product | Specific Surface Area (m²/g) | | 1359 | 1632 | 1962 | 1727 | 1651 |
| | Pore Volume (cm³/g) | | 0.621 | 0.78 | 0.981 | 0.824 | 0.76 |

TABLE 2

| Items | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Electrode Density (g/cc) | 0.53 | 0.52 | 0.54 | 0.53 | 0.55 | 0.63 | 0.65 | 0.51 | 0.56 | 0.52 | 0.49 |
| Capacitance Per Unit Mass (F/g) | 44.6 | 47.2 | 46.3 | 45.3 | 47.4 | 40.7 | 40.5 | 44.6 | 44.1 | 44 | 43.2 |
| Capacitance Per Unit Volume (F/cc) | 27.6 | 24.3 | 25.2 | 24 | 26.3 | 25.6 | 26.3 | 22.6 | 24.7 | 22.9 | 21.2 |
| Internal Resistance (Ω) | 2.2 | 2.6 | 2.4 | 2.5 | 2.7 | 2.8 | 2.8 | 3.1 | 2.9 | 3.3 | 3.4 |
| Rate Characteristics*) (%) | 61.2 | 64.4 | 64.4 | 62.7 | 62.5 | 56.9 | 56.4 | 59.7 | 60.1 | 51.4 | 54.4 |

*)Maintenance rate of capacitance at a constant current dischage (72 mA/cm²) on the basis of capacitance per volume (0.36 mA/cm²) at a constant current discharge (0.36 mA/cm²)

APPLICABILITY IN THE INDUSTRY

The present invention has a significantly large industrial value because it can proceed with a reaction of a carbon material and an alkali activator in a less amount than ever before in an extremely efficient manner and thus can provide an activated carbon that is excellent in uniformity and has a large capacitance per unit volume.

The invention claimed is:

1. A method for producing an activated carbon for an electric double layer capacitor electrode comprising adjusting a carbon material (including a calcined product of a carbon material) in particle size, followed by mixing the carbon material with an alkali activator at a mix ratio of the carbon material: alkali activator of 1:1 to 1:4 by mass with a pulverizing mixer having both a pulverizing-mixing function and a classifying function, and then activating the mixture to produce the activated carbon, wherein the mixing is carried out so that the particle size distribution composed of particles with a size of 300 m or greater in the mixture of the carbon material and alkali activator is 5 percent or less, and wherein the activated carbon has a specific surface area of 1,500 to 3,000 m²/g and a pore volume of the pores with a diameter of 0.1 to 50 nm determined by a nitrogen gas adsorption method in from 0.5 to 3 ml/g.

2. The method according to claim 1, wherein the carbon material is graphitizable.

3. The method according to claim 1, wherein the calcination temperature for producing the calcined product of a carbon material is 500° C. or higher and 700° C. or lower.

4. The method according to claim 1, wherein the carbon material having been adjusted in particle size has an average particle diameter of 1 m or larger and 15 m or smaller.

5. The method according to claim 1, wherein a ratio of D90:D50 is 4.75 to 5.63.

6. The method according to claim 2, wherein a ratio of D90:D50 is 4.75 to 5.63.

7. The method according to claim 3, wherein a ratio of D90:D50 is 4.75 to 5.63.

8. The method according to claim 4, wherein a ratio of D90:D50 is 4.75 to 5.63.

* * * * *